United States Patent [19]

Dumoulin, Jr.

[11] Patent Number: 5,373,708
[45] Date of Patent: Dec. 20, 1994

[54] COOLER WITH FOLD-DOWN CORNER WHEELS, A POP-UP PULL HANDLE, INTEGRAL BOTTLE AND FOLD DOWN CUTTING BOARD

[76] Inventor: Joseph C. Dumoulin, Jr., 6334 Hampden, Taylor, Mich. 48180

[21] Appl. No.: 186,317

[22] Filed: Jan. 25, 1994

[51] Int. Cl.5 .............................................. F25D 3/08
[52] U.S. Cl. .................................. 62/457.7; 62/371; 62/258; 62/331; 280/30; 280/43
[58] Field of Search ............... 62/457.1, 457.2, 457.7, 62/457.9, 371, 258, 331; 280/30, 47.26, 643, 655, 43; 312/351, 214

[56] References Cited

U.S. PATENT DOCUMENTS

| | | | |
|---|---|---|---|
| 3,395,550 | 8/1968 | Dugan | 62/457.7 |
| 3,944,241 | 3/1976 | Epelbaum | 280/30 |
| 4,449,378 | 5/1984 | Thorpe | 62/371 |
| 4,846,493 | 7/1989 | Mason | 280/38 |
| 5,228,706 | 7/1993 | Bovile | 280/30 |
| 5,249,438 | 10/1993 | Rhaney et al. | 62/457.7 |

Primary Examiner—John M. Sollecito

[57] ABSTRACT

A cooler container having a rectangular configuration, each lower corner of the container having a recess. Also provided is a lid with a hinge. A latch is secured to the lid and side wall opposite from the hinge. A plurality of wheels are, each supported within a recess of the container, each wheel having a rod each with an upper end and an associated shaft for pivotally securing the rod to the container, the lower end of each rod being provided with an axle supporting a wheel and an axially reciprocable pin secured to the rod at an intermediate location, the rod being adapted to pivot to an elevated orientation wherein the rod and wheel are totally located within the recess and a lower orientation wherein the rod extends generally vertically with the wheel at a location beneath the cooler for effecting the rolling movement of the container, the recess being formed with a pair of apertures adapted to receive the reciprocable pin, the reciprocable pin being positioned in the lower recess to secure the rod and wheel in the operative rolling orientation and with the pin receivable in the lateral off-set recess for securing the pin, rod and wheel in the stored condition, the reciprocable pin being spring urged into contact with one of the recesses.

2 Claims, 4 Drawing Sheets

FIG. 5
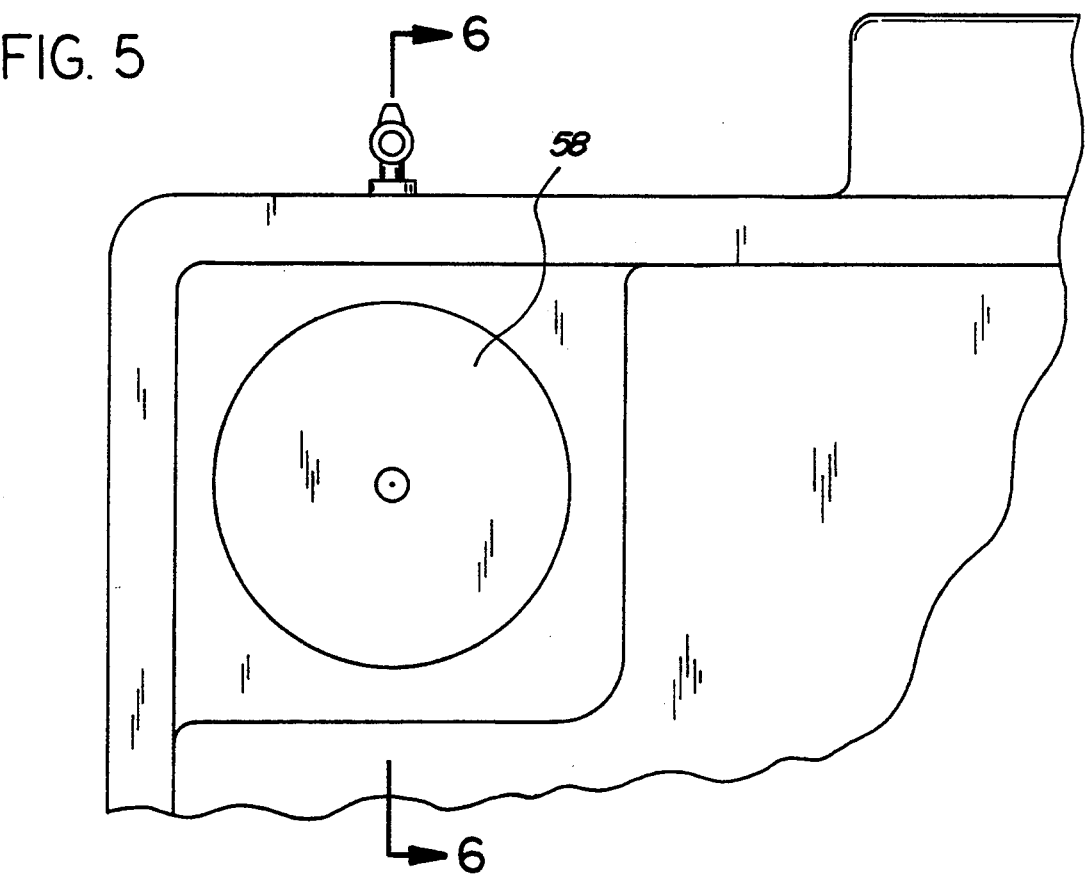
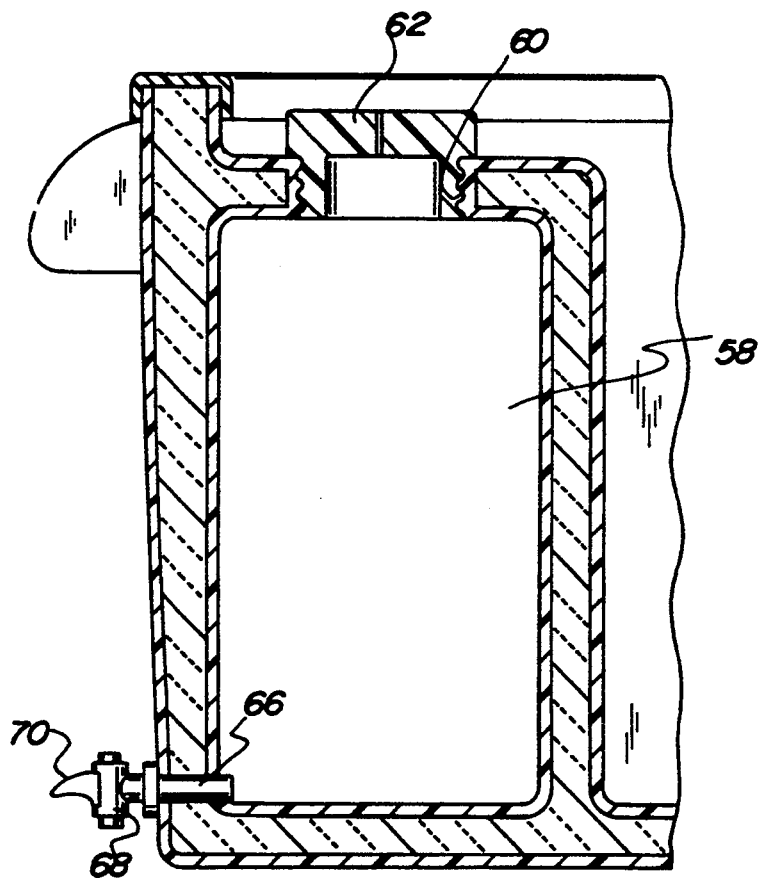
FIG. 6

COOLER WITH FOLD-DOWN CORNER WHEELS, A POP-UP PULL HANDLE, INTEGRAL BOTTLE AND FOLD DOWN CUTTING BOARD

BACKGROUND OF THE INVENTION

1. Field of the Invention

The present invention relates to coolers with fold-down corner wheels and a pop-up pull handle for improving mobility and more particularly pertains to increasing the mobility and hence the utility of coolers by utilizing four corner pivot down wheels and an associated pull handle which is retractable when not in use.

2. Description of the Prior Art

The use of easing the transportation of heavy coolers is known in the prior art. More specifically, easing the transportation of heavy coolers heretofore devised and utilized for the purpose of portable coolers are known to consist basically of familiar, expected, and obvious structural configurations, notwithstanding the myriad of designs encompassed by the crowded prior art which has been developed for the fulfillment of countless objectives and requirements.

By way of example, the prior art in U.S. Pat. No. Des. 328,221 to Piccarillo discloses a wheeled cooler chest.

U.S. Pat. No. 3,591,194 to Vega discloses an ice chest cart.

U.S. Pat. No. 4,724,681 to Bartholomew discloses a portable wheeled cooler apparatus.

U.S. Pat. No. 4,846,493 to Mason discloses a portable cooler with retractable wheels.

Lastly, U.S. Pat. No. 5,169,164 to Bradford discloses a cooler tote.

In this respect, the coolers with fold-down corner wheels and a pop-up pull handle for improving mobility according to the present invention substantially depart from the conventional concepts and designs of the prior art, and in doing so provide an apparatus primarily developed for the purpose of increasing the mobility and hence the utility of coolers by utilizing four corner pivot down wheels and an associated pull handle which is retractable when not in use.

Therefore, it can be appreciated that there exists a continuing need for new and improved coolers with fold-down corner wheels and a pop-up pull handle for improving mobility which can be used for increasing the mobility and hence the utility of coolers by utilizing four corner pivot down wheels and an associated pull handle which is retractable when not in use. In this regard, the present invention substantially fulfills this need.

SUMMARY OF THE INVENTION

In view of the foregoing disadvantages inherent in the known types of easing the transportation of heavy coolers now present in the prior art, the present invention provides improved coolers with fold-down corner wheels and a pop-up pull handle for improving mobility. As such, the general purpose of the present invention, which will be described subsequently in greater detail, is to provide new and improved coolers with fold-down corner wheels and a pop-up pull handle for improving mobility and method which has all the advantages of the prior art and none of the disadvantages.

To attain this, the present invention essentially comprises a new and improved cooler with fold-down corner wheels and a pop-up pull handle for improved mobility comprising a container having elongated parallel side walls in a rectangular configuration and having shortened parallel end walls in a rectangular configuration and having a rectangular bottom wall with its edges coupled to the lower edges of the side and end wall to form a cooling chamber therein, each lower corner of the container having a recess. Also provided is a lid in a rectangular configuration with a hinge coupled along one edge thereof and to an adjacent upper edge of a side wall for movement between an opened orientation allowing access to the contents of the container and a closed orientation for effectively sealing the chamber. A latch is secured to the lid and side wall opposite from the hinge to lock the lid in the closed orientation but to allow unlocking for opening the lid to the open orientation. A plurality of wheels are also provided, each wheel being rotatably supported within a recess of the container, each wheel having associated therewith a rod each with an upper end and an associated shaft for pivotally securing the rod to the container, the lower end of each rod being provided with an axle for supporting a rotatable wheel and with an axially reciprocable pin secured to the rod at an intermediate location, the rod being adapted to pivot to an elevated orientation wherein the rod and wheel are totally located within the recess and a lower orientation wherein the rod extends generally vertically with the wheel at a location beneath the cooler for effecting the rolling movement of the container, the recess being formed with a pair of apertures one beneath the pivot point and one laterally off-set from the pivot point each adapted to receive the reciprocable pin, the reciprocable pin being positioned in the lower recess to secure the rod and wheel in the operative rolling orientation and with the pin receivable in the lateral off-set recess for securing the pin, rod and wheel in the stored condition, the reciprocable pin being spring urged into contact with one of the recesses and retractable against the action of the spring by an operator to allow movement of the pin from one orientation to the other. A separate thermos bottle is formed into one side wall and one end wall interiorly of the walls within the chamber, the thermally insulated bottle having a threaded opening at the top with an associated cap with a threaded exterior surface to allow movement of the cap into sealing orientation with respect to the bottle and to allow the threaded removal of the cap from the bottle for filling up the thermos, the thermos also including a line extending from the interior of the bottle to exterior of the container with a valve exterior of the container to allow dispensing of the liquid contents of the bottle at the discretion of the user. A planar recess is formed into one side wall of the container with a hinge located at the lower extent thereof, a generally rectangular cutting board with its lower edge coupled to the hinge and moveable between a generally horizontal operative orientation and a raised inoperative orientation within the recess of the side wall, a flexible coupling adapted to secure between the side wall and the end of the cutting board remote from the hinge to sustain the cutting board in a horizontal orientation and a button in the cutting board operatively positioned with respect to a detente hole in the side of the recess to secure the cutting board in its inoperative position essentially parallel with the side wall in which it is contained.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved coolers with fold-down corner wheels and a pop-up pull handle for improving mobility which have all the advantages of the prior art easing the transportation of heavy coolers and none of the disadvantages.

It is another object of the present invention to provide new and improved coolers with fold-down corner wheels and a pop-up pull handle for improving mobility which may be easily and efficiently manufactured and marketed.

It is further object of the present invention to provide new and improved coolers with fold-down corner wheels and a pop-up pull handle for improving mobility which are of durable and reliable constructions.

An even further object of the present invention is to provide new and improved coolers with fold-down corner wheels and a pop-up pull handle for improving mobility which are susceptible of a low cost of manufacture with regard to both materials and labor, and which accordingly are then susceptible of low prices of sale to the consuming public, thereby making such coolers with fold-down corner wheels and a pop-up pull handle for improving mobility economically available to the buying public.

Still yet another object of the present invention is to provide new and improved coolers with fold-down corner wheels and a pop-up pull handle for improving mobility which provide in the apparatuses and methods of the prior art some of the advantages thereof, while simultaneously overcoming some of the disadvantages normally associated therewith.

Still another object of the present invention is to increase the mobility and hence the utility of coolers by utilizing four corner pivot down wheels and an associated pull handle which is retractable when not in use.

Lastly, it is an object of the present invention to provide new and improved coolers with fold-down corner wheels and a pop-up pull handle for improved mobility comprising a container having elongated parallel side walls in a rectangular configuration and having shortened parallel end walls in a rectangular configuration and having a rectangular bottom wall with its edges coupled to the lower edges of the side and end wall to form a cooling chamber therein, each lower corner of the container having a recess. A lid in a rectangular configuration has a hinge coupled along one edge thereof and to an adjacent upper edge of a side wall for movement between an opened orientation allowing access to the contents of the container and a closed orientation for effectively sealing the chamber. A latch is secured to the lid and side wall opposite from the hinge to lock the lid in the closed orientation but to allow unlocking for opening the lid to the open orientation. Also provided are a plurality of wheels, each wheel being rotatably supported within a recess of the container, each wheel having associated therewith a rod each with an upper end and an associated shaft for pivotally securing the rod to the container, the lower end of each rod being provided with an axle for supporting a rotatable roller and with an axially reciprocable pin secured to the rod at an intermediate location, the rod being adapted to pivot to an elevated orientation wherein the rod and wheel are totally located within the recess and a lower orientation wherein the rod extends generally vertically with the wheel at a location beneath the cooler for effecting the rolling movement of the container, the recess being formed with a pair of apertures one beneath the pivot point and one laterally off-set from the pivot point each adapted to receive the reciprocable pin, the reciprocable pin being positioned in the lower recess to secure the rod and wheel in the operative rolling orientation and with the pin receivable in the lateral off-set recess for securing the pin, rod and wheel in the stored condition, the reciprocable pin being spring urged into contact with one of the recesses and retractable against the action of the spring by an operator to allow movement of the pin from one orientation to the other.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a plan view of the device shown in the prior Figures but constructed in accordance with an alternate embodiment of the invention.

FIG. 6 is a sectional view of the device of FIG. 5 taken along line 6—6 of FIG. 5.

The same reference numerals refer to the same parts throughout the various Figures.

DESCRIPTION OF THE PREFERRED EMBODIMENT

Figure 1:
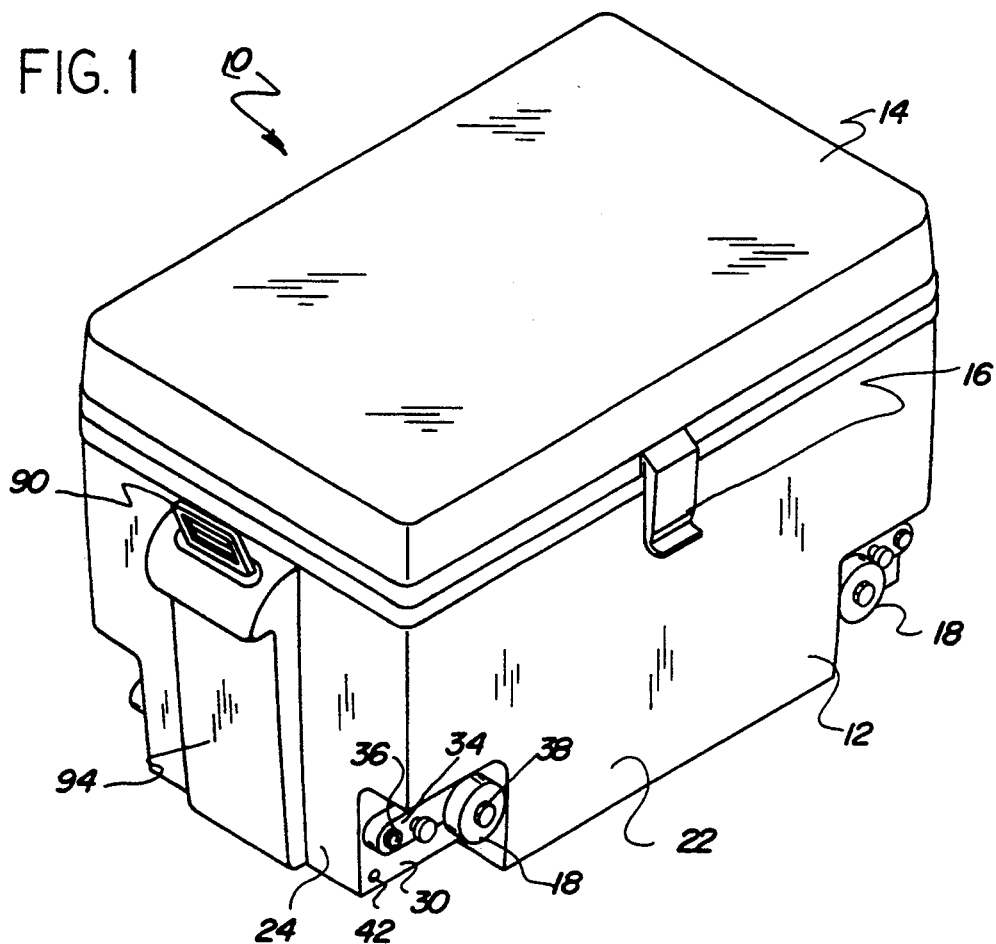
FIG. 1 is a perspective illustration of the preferred embodiment of the coolers with fold-down corner wheels and a pop-up pull handle for improving mobility constructed in accordance with the principles of the present invention.

With reference now to the drawings, and in particular to FIG. 1 thereof, the preferred embodiment of the new and improved coolers with fold-down corner wheels and a pop-up pull handle for improving mobility embodying the principles and concepts of the present invention and generally designated by the reference numeral 10 will be described.

Specifically, FIGS. 1 through 4 illustrate a cooler with fold-down corner wheels and a pop-up handle for improved mobility. The cooler 10, in its broadest context, is comprised of a container 12, a lid 14, a latch 16 and a plurality of wheels 18.

More specifically, the container 12 has elongated parallel side walls 22 of a rectangular configuration. It also has shortened parallel end walls 24 also in a rectangular configuration. A rectangular bottom wall 26 is also in a rectangular configuration. It has its edges coupled to the lower edges of the side wall as well as the lower edges of the end wall. As such, the walls together form a cooling chamber therebetween. Each lower corner of the container is formed with a recess 30.

The lid 14 is also fabricated in a rectangular configuration. In association therewith, a hinge couples one edge of the lid to an adjacent upper edge of a side wall. This allows for movement of the lid between an open orientation. In such open orientation access is allowed to the contents of the container. The lid is also moveable to a closed orientation for effectively sealing the chamber to retain the contents of the cooler at a proper temperature.

Secured to the lid and side wall opposite from the hinge is a latch 16. The latch functions to lock the lid in the closed orientation. The latch, however, also allows unlocking of the lid to allow the lid to be raised for opening the chamber for the addition of contents to the chamber or for its removal.

The next major component of the cooler are the plurality of wheels 18. Each of the wheels is rotatably supported at one recess 30 of the container 10. Each wheel has associated therewith a rod 34. Each rod 34 has an upper extent and an associated shaft 36 for pivotally securing the rod to the container 12. The lower end of each rod is provided with an axle 38. The axle functions for supporting a rotatable wheel 18.

Figure 2:
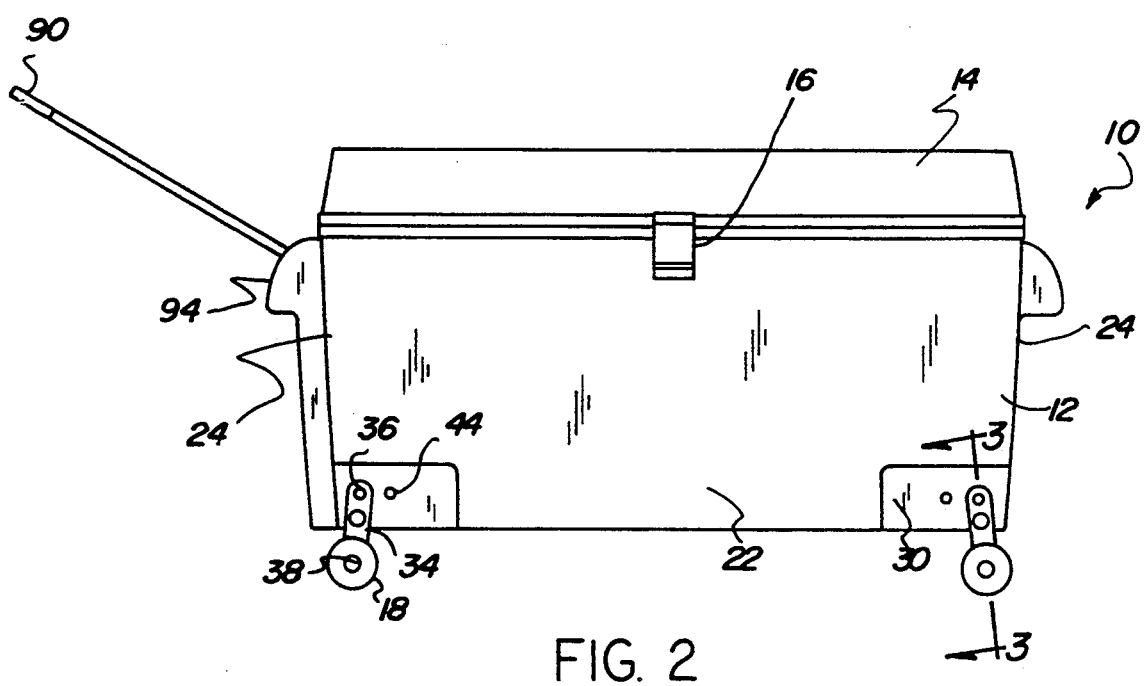
FIG. 2 is a side elevational view of the cooler shown in FIG. 1 but with the wheels and handle in the deployed orientation.
Figure 3:
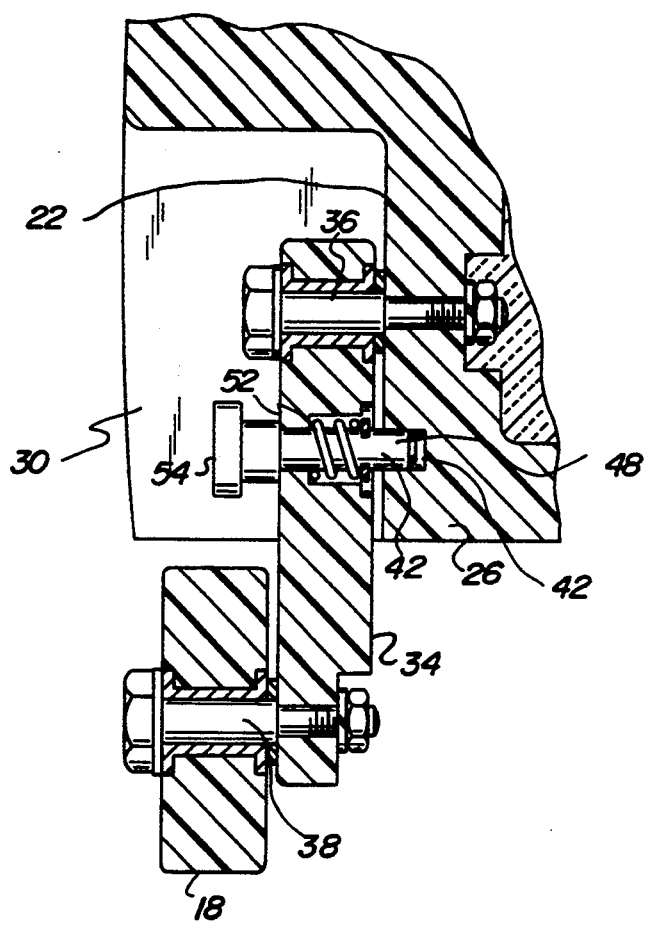
FIG. 3 is a sectional view of the wheel assembly taken along line 3—3 of FIG. 2.

Also provided in association therewith is an axially reciprocable pin 42. The pin 42 is secured to the rod 34 at a location intermediate with the rod 36 and axle 38. The rod 34 is adapted to pivot to an elevated orientation as shown in FIG. 1 wherein the rod 34 and wheel 18 are totally located within the recess 30. Such components are also rotatable to a lower orientation as shown in FIGS. 2 and 3 wherein the rod 34 extends generally vertically with the wheel 18 at a location beneath the cooler. It is in this location where rolling movement of the cooler 10 may be effected.

The recess 30 is formed with a pair of apertures 42 and 44. One aperture 42 is located beneath the pivot rod 36 and its pivot point. The other aperture 44 is laterally off-set from such pivot rod 36 and its pivot point. Each of these apertures is adapted to receive a reciprocable pin 48. The reciprocable pin 48 is positioned in the lower recess 42 to secure to rod 34 and wheel 18 in the operative rolling orientation. With the pin 48 received in the laterally off-set recess 44 the pin 48, rod 34, and wheel 18 are in a stored orientation.

The reciprocable pin 48 is urged by a spring 52 into contact with one of the recesses 42 or 44. The spring being located within the rod 34 effects the urging of the pin 48 into a recess. The pin 48 has a head 54 which the user may pull to withdraw the opposite end of the pin out of a recess to allow the rod 34 and wheel 18 to be moved from one orientation to the other.

Shown in FIGS. 5 and 6 is an alternate embodiment of the invention. In such alternate embodiment a separate thermally insulated bottle 58 is formed into a area of joining between one side wall 22 and one end wall 24. Such bottle 58 is formed within the chamber. The bottle 58 has a threaded opening 60 at its top. An associated cap with matable threads is also provided to allow movement of the cap into a sealing orientation as shown in FIG. 6. The cap may also be unscrewed with respect to the body of the thermally insulated bottle by the threaded removal of the cap from the thermos. This allows for filling the bottle with an appropriate fluid or ice. The bottle 58 also includes a tubular line 66 extending from the interior of the bottle 58 to exterior of the container 12. A valve 68 exterior of the container allows dispensing of liquid content from the bottle at the discretion of the user. A handle 70 under the operator's control allows opening or closing of the valve 68.

Figure 7:
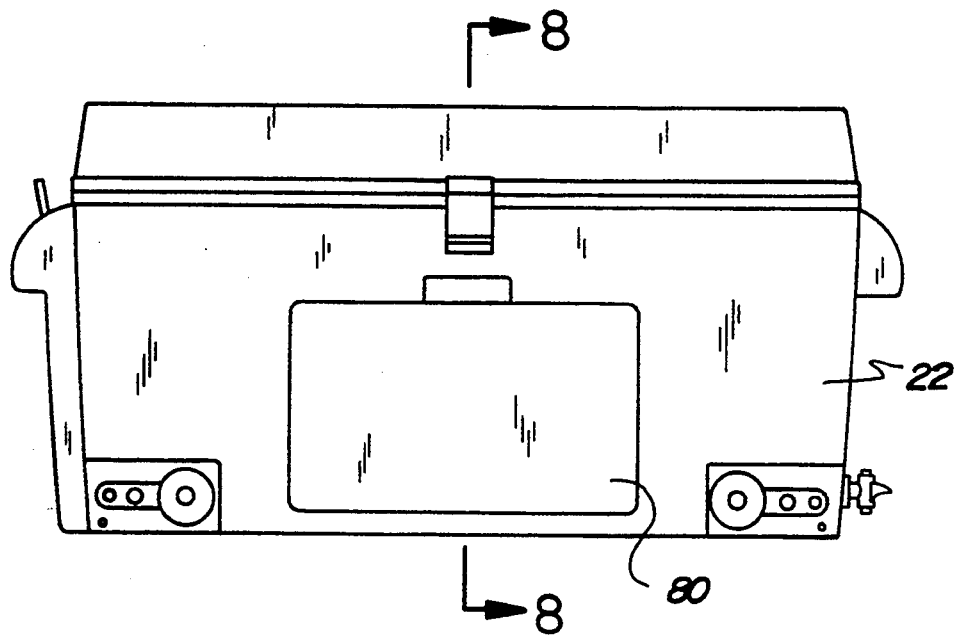
FIG. 7 is a side elevational view of the device shown in the prior Figures but illustrating another alternate embodiment of the invention.
Figure 8:
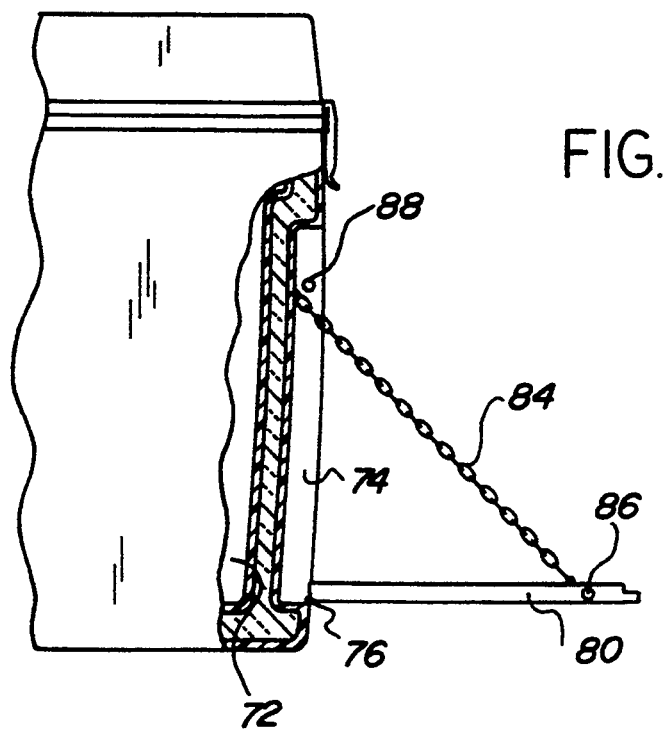
FIG. 8 is a sectional view taken along line 8—8 of FIG. 7 but with the cutting board in a lower deployed orientation.

The final embodiment of the invention is shown in FIGS. 7 and 8. In such embodiment, a planar recess 74 is formed into one of the side walls 22 of the container 12. A hinge 76 is located at the lower extent of the recess. A generally rectangular cutting board is then provided with its lower edge coupled to the hinge 76. The cutting board is movable between a generally horizontal operative orientation as shown in FIG. 8 and a raised inoperative orientation within the recess of the side wall as shown in FIG. 7. A flexible coupling 84 is adapted to be secured between the adjacent side wall and the end of the cutting board remote from the hinge 76. This coupling functions to sustain the cutting board in the generally horizontal orientation for use. A button 88 is formed in the cutting board along one edge. It is operatively positioned with respect to an associated detente recess 88 to secure the cutting board vertically in its inoperative position as shown in FIG. 7. This position is essentially parallel with the adjacent side wall 22 within the recess 74 in which it is contained for storage.

Figure 4:
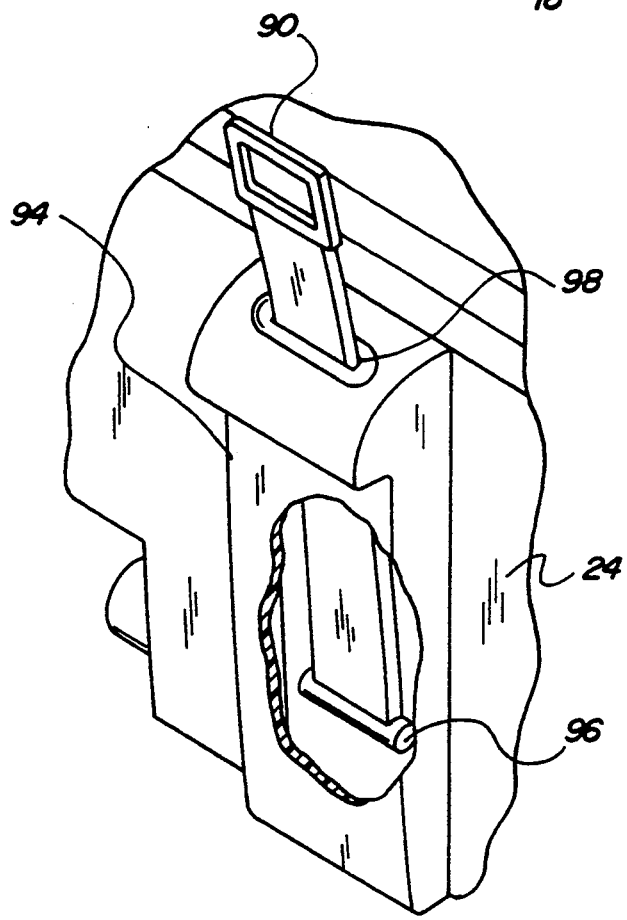
FIG. 4 is an enlarged perspective view of the handle arrangement with parts broken away to show certain internal construction thereof.

One last feature of the invention is shown most specifically in FIG. 4. Such feature is the pop-up handle 90. The pop-up handle is a component which may be applied to any of the embodiments of the invention. The handle has an upper end adapted to be grasped by the user for pulling the container when the wheels 18 are in the lower orientation. It is positioned within a housing 94 located in one end wall 24 of the container. The handle has an extended vertical component with an enlargement 96 at its lower end. Such enlargement 96 as well as the upper grasping portion of the handle are larger than the aperture 98 in the housing 94. In this manner, the handle may be pulled to an extended orientation as shown in FIG. 2 for pulling the cooler 10. When not being transported, the handle may be recessed into the compartment as shown in FIG. 1. FIG. 4 with its cut-out illustration shows the handle at an intermediate location where it can be readily seen that the enlargement at the top and bottom of the handle preclude separation thereof from the cooler while allowing movement between the positions shown in FIGS. 1 and 2.

The present invention is a cooler that is different from anything currently available, as it has a stretch handle and four wheels. An important feature is that the wheels, which are located near the bottom of the cooler, pop in and out. When you want to push or pull the present invention, pop out the wheels and give a slight tug on the stretch handle. In a matter of a few seconds, it is ready to go. After reaching your destination, just pop in the wheels and set the present invention on the picnic table, bench, ground, etc.

The present invention makes it much faster and easier to transport a cooler than by picking it up and carrying it. In addition, the chance of a back injury occurring is significantly reduced because there is less stress put on your body. The present invention is made from plastic and is extremely durable, as well as versatile and very attractive.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved cooler with fold-down corner wheels and a pop-up pull handle for improved mobility comprising, in combination:

a container having elongated parallel side walls in rectangular configuration and having shortened parallel end walls in a rectangular configuration and having a rectangular bottom wall with its edges coupled to the lower edges of the side and end wall to form a cooling chamber therein, each lower corner of the container having a recess:

a lid in a rectangular configuration with a hinge coupled along one edge thereof and to an adjacent upper edge of a side wall for movement between an opened orientation allowing access to the contents of the container and a closed orientation for effectively sealing the chamber;

a latch secured to the lid and side wall opposite from the hinge to lock the lid in the closed orientation but to allow unlocking for opening the lid to the open orientation;

a plurality of wheels, each wheel being rotatably supported within a recess of the container, each wheel having associated therewith a rod each with an upper end and an associated shaft for pivotally securing the rod to the container, the lower end of each rod being provided with an axle for supporting a rotatable wheel and with an axially reciprocable pin secured to the rod at an intermediate location, the rod being adapted to pivot to an elevated orientation wherein the rod and wheel are totally located within the recess and a lower orientation wherein the rod extends generally vertically with the wheel at a location beneath the cooler for effecting the rolling movement of the container, the recess being formed with a pair of apertures one beneath the pivot point and one laterally off-set from the pivot point each adapted to receive the reciprocable pin, the reciprocable pin being positioned in the lower recess to secure the rod and wheel in the operative rolling orientation and with the pin receivable in the lateral off-set recess for securing the pin, rod and wheel in the stored condition, the reciprocable pin being spring urged into contact with one of the recesses and retractable against the action of the spring by an operator to allow movement of the pin from one orientation to the other;

a separate thermally insulated bottle formed into one side wall and one end wall interiorly of the walls within the chamber, the bottle having a threaded opening at the top with an associated cap with a threaded exterior surface to allow movement of the cap into sealing orientation with respect to the bottle and to allow the threaded removal of the cap from the bottle for filling up the bottle, the bottle also including a line extending from the interior of the bottle to exterior the container with a valve exterior of the container to allow dispensing of the liquid contents of the bottle at the discretion of the user; and a planar recess formed into one side wall of the container with a hinge located at the lower extent thereof, a generally rectangular cutting board with its lower edge coupled to the hinge and moveable between a generally horizontal operative orientation and a raised inoperative orientation within the recess of the side wall, a flexible coupling adapted to secure between the side wall and the end of the cutting board remote from the hinge to sustain the cutting board in a horizontal orientation and a button in the cutting board operatively positioned with respect to a detente hole in the side of the recess to secure the cutting board in its inoperative position essentially parallel with the side wall in which it is contained.

2. A cooler with improved mobility comprising:

a container having elongated parallel side walls in a rectangular configuration and having shortened parallel end walls in a rectangular configuration and having a rectangular bottom wall with its edges coupled to the lower edges of the side and end wall to form a cooling chamber therein, each lower corner of the container having a recess;

a lid in a rectangular configuration with a hinge coupled along one edge thereof and to an adjacent upper edge of a side wall for movement between an opened orientation and a closed orientation;

a latch secured to the lid and side wall opposite from the hinge to lock the lid in the closed orientation but to allow unlocking for opening the lid to the open orientation;

a plurality of wheels, each wheel being rotatably supported within a recess of the container, each wheel having associated herewith a rod each with an upper end and an associated shaft for pivotally securing the rod to the container, the lower end of each rod being provided with an axle for supporting a rotatable wheel and with an axially reciprocable pin secured to the rod at an intermediate location, the rod being adapted to pivot to an elevated orientation wherein the rod and wheel are totally located within the recess and a lower orientation wherein the rod extends generally vertically with the wheel at a location beneath the cooler for effecting the rolling movement of the container, the recess being formed with a pair of apertures one beneath the pivot point and one laterally off-set from the pivot point each adapted to receive the reciprocable pin, the reciprocable pin being positioned in the lower recess to secure the rod and wheel in the operative rolling orientation and with the pin receivable in the lateral off-set recess for securing the pin, rod and wheel in the stored condition, the reciprocable pin being spring urged into contact with one of the recesses and retractable against the action of the spring by an operator; and a planar recess formed into one side wall of the container with a hinge located at the Lower extent thereof, a generally rectangular cutting board with its lower edge coupled to the hinge and movable between a generally horizontal operative orientation and a raised inoperative orientation within the recess of the side wall, a flexible coupling adapted to secure between the side wall and the end of the cutting board remote from the hinge to sustain the cutting board in a horizontal orientation and a button in the cutting board operatively positioned with respect to a detente hole in the side of the recess to secure the cutting board in its inoperative position essentially parallel with the side wall in which it is contained.

* * * * *